(12) United States Patent
Daft et al.

(10) Patent No.: US 12,458,817 B2
(45) Date of Patent: Nov. 4, 2025

(54) WEARABLE CLOSED LOOP TUS SYSTEM

(71) Applicant: Sanmai Technologies, PBC, Sunnyvale, CA (US)

(72) Inventors: Christopher Daft, Tucson, AZ (US); Bicheng Wu, Palo Alto, CA (US)

(73) Assignee: Sanmai Technologies, PBC, Sunnyvale, CA (US)

( * ) Notice: Subject to any disclaimer, the term of this patent is extended or adjusted under 35 U.S.C. 154(b) by 0 days.

(21) Appl. No.: 18/920,615

(22) Filed: Oct. 18, 2024

(65) Prior Publication Data

US 2025/0161718 A1 May 22, 2025

Related U.S. Application Data

(60) Provisional application No. 63/601,577, filed on Nov. 21, 2023.

(51) Int. Cl.
*A61N 7/00* (2006.01)
*B06B 1/06* (2006.01)
*G06F 21/44* (2013.01)

(52) U.S. Cl.
CPC .............. *A61N 7/00* (2013.01); *B06B 1/0622* (2013.01); *G06F 21/44* (2013.01); *A61N 2007/0026* (2013.01); *A61N 2007/0056* (2013.01); *A61N 2007/0082* (2013.01); *B06B 2201/76* (2013.01)

(58) Field of Classification Search
CPC .............. A61N 2007/0021; A61N 2007/0026
See application file for complete search history.

(56) References Cited

U.S. PATENT DOCUMENTS

| | | | |
|---|---|---|---|
| 9,370,658 B2 | 6/2016 | Neuvonen et al. | |
| 10,265,497 B2 | 4/2019 | Tsai et al. | |
| 11,759,661 B2 | 9/2023 | Schafer et al. | |
| 11,766,576 B2 | 9/2023 | Jordan et al. | |
| 2009/0112133 A1 | 4/2009 | Deisseroth et al. | |
| 2010/0160779 A1* | 6/2010 | Browning | A61B 8/08 |
| | | | 600/454 |
| 2012/0083719 A1 | 4/2012 | Mishelevich | |
| 2016/0067526 A1 | 3/2016 | Yang | |
| 2016/0220850 A1 | 8/2016 | Tyler | |

(Continued)

OTHER PUBLICATIONS

Qiu et al., "Piezoelectric Micromachined Ultrasound Transducer (PMUT) Arrays for Integrated Sensing, Actuation and Imaging", Sensors, https://doi.org/10.3390/s150408020, vol. 15, 2015, pp. 8020-8041.

(Continued)

*Primary Examiner* — Colin T. Sakamoto
(74) *Attorney, Agent, or Firm* — Artegis Law Group, LLP

(57) ABSTRACT

A TUS (transcranial ultrasound) system with a matrix array transducer in a wearable format is disclosed. The TUS system uses ASIC (application-specific integrated circuit) and MEMS (micro-electromechanical system) technologies to achieve power, size, and weight reductions, allowing the device to be worn. In an embodiment, the TUS system can reliably find a target anatomical structure and remain locked onto the target throughout usage. All real-time tasks are controlled locally within the TUS system for a closed-loop operation. Safeguards enable subjects to use the system at home for medical treatment and wellness usage, as well as in a clinic. A method for using the system is disclosed.

22 Claims, 10 Drawing Sheets

(56) References Cited

U.S. PATENT DOCUMENTS

| | | | |
|---|---|---|---|
| 2017/0182339 A1 | 6/2017 | Wurster et al. | |
| 2018/0304101 A1 | 10/2018 | Yang | |
| 2019/0159761 A1* | 5/2019 | Erkamp | ............... B06B 1/02 |
| 2020/0054414 A1 | 2/2020 | Wagner et al. | |
| 2021/0370064 A1* | 12/2021 | Murphy | ........... A61N 1/0484 |
| 2023/0210493 A1 | 7/2023 | Kubanek | |
| 2025/0073502 A1* | 3/2025 | He | ................. G16H 20/40 |

OTHER PUBLICATIONS

Extended European Search report for Application No. 24214394.9 dated Apr. 16, 2025.

* cited by examiner

WEARABLE CLOSED LOOP TUS SYSTEM

CROSS-REFERENCE TO RELATED APPLICATIONS

This application claims priority benefit of the United States Provisional Patent Application titled "WEARABLE CLOSED LOOP TFUS SYSTEM," filed on Nov. 21, 2023, and having Ser. No. 63/601,577. The subject matter of this related application is hereby incorporated herein by reference.

TECHNICAL FIELD

This invention relates to transcranial ultrasound systems (TUS) as a wearable wellness device capable of operation in clinical and non-clinical settings.

BACKGROUND

TUS systems help treat several types of mental illness, but these systems do not guarantee that the ultrasound stimulation accurately reaches the anatomical targets. The skull's curvature and its variation in thickness obscure the ultrasound (US) delivery to the desired location, especially with small and deep targets such as the amygdala.

Matrix array systems can solve the problem of poor targeting by acquiring volume data sets of brain anatomy. Current solutions are targeted for clinically controlled usage, where a clinician defines the treatment for an illness. There is a need to expand the capabilities of TUS systems as a wellness device for individuals who want to improve their well-being, even if they do not have any medical diagnosis. Additionally, at-home medical treatment controlled by a physician has cost and convenience advantages over in-clinic procedures. For this, the TUS system needs to be in a wearable format. In addition to ensuring that wearable TUS systems correctly target the correct anatomical target safely, large cost, power, size, and weight reductions are required for the system to be in a wearable form factor.

DETAILED DESCRIPTION

Figure 1:
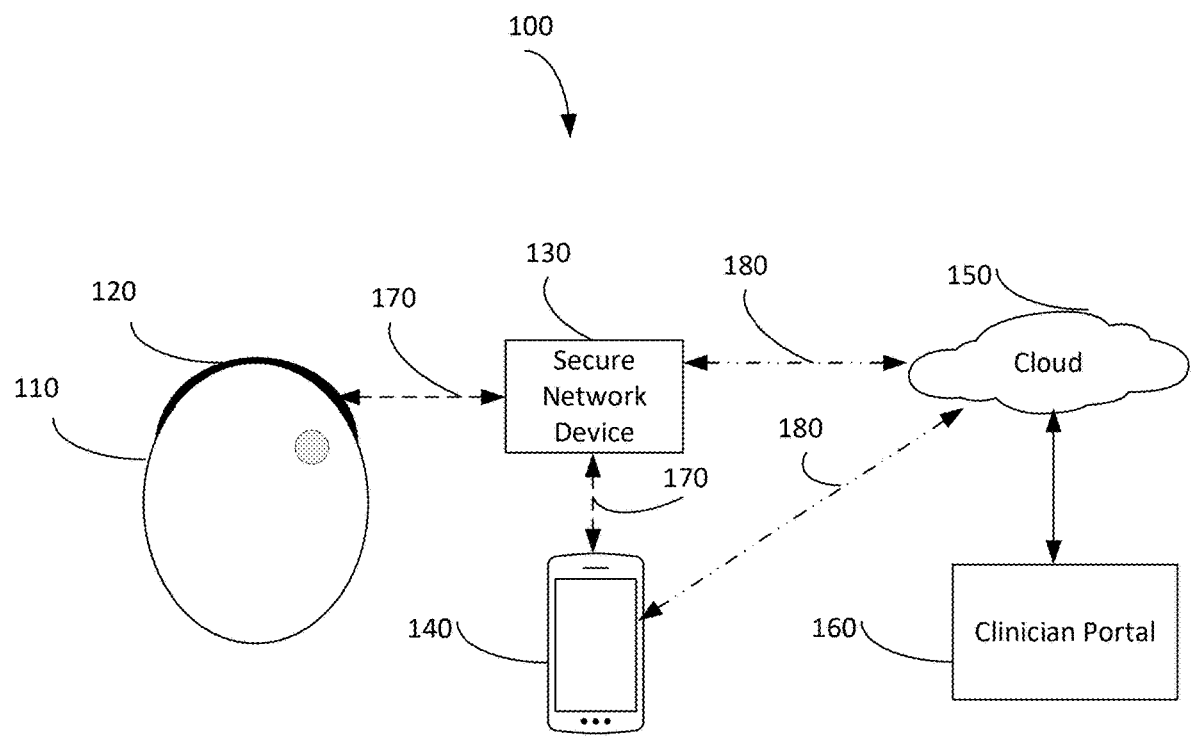
FIG. 1 shows a wearable TUS system 100 as per an embodiment.

A TUS (transcranial ultrasound) system with a matrix array transducer in a wearable format is disclosed. The TUS system uses ASIC (application-specific integrated circuit) and MEMS (micro-electromechanical system) technologies to achieve power, size, and weight reductions, allowing the device to be worn. In an embodiment, the TUS system can reliably find a target anatomical structure and remain locked onto the target throughout usage. All real-time tasks are controlled locally within the TUS system for closed-loop operation.

In this invention, there are two loops which are closed. One is that the guidance measurements continuously update the wearable's knowledge of the location of the stimulation target or targets. That knowledge is used to modify the direction and focal length of the stimulation beam to render the target locked even as the subject moves. The second is that the timing of the stimulation may be controlled by information derived from EEG measurements. Safeguards enable subjects to use the system at home for medical treatment and wellness usage. A method for using the system is disclosed.

This application discloses a TUS system with a matrix array transducer in a wearable format. Two-dimensional rectangular arrays of transducer transducers are also known as matrix array transducers. Wearable devices are made possible by dramatic power, size, and weight reductions enabled by this invention. In an implementation, ASIC (application-specific integrated circuit) and MEMS (micro-electromechanical system) technology achieve the reductions, allowing the device to be worn. The MEMS die sits atop the ASIC with vertical interconnects in an implementation. In an embodiment, the MEMS device is inverted so that its active surface faces the active surface of the ASIC. The acoustic output comes from the back side of the MEMS die, which is at the top of the stack. Cavities are etched into the back side of the MEMS die using a process such as Deep Reactive Ion Etching (DRIE).

In an embodiment, the TUS system can reliably find a target and remain locked onto the target throughout usage. The TUS system sends and receives sound (ultrasound waves) in various directions, sequentially creating "beams." The beams can be controlled by a set of parameters stored in local memory (e.g., in a table format) and are referred to in this application as "beam lists." Upon receiving a "start" signal (from the subject via an app operating on a subject device such as a smartphone), all real-time tasks can be controlled locally within the wearable system (i.e., closed-loop operation). Safeguards in the system ensure that the TUS system can be used at home or in a clinic under a treatment protocol defined by a clinician. In a different embodiment, the TUS system is used by a subject who does not have any medical diagnosis but uses it to improve their well-being. In the wellness mode or application, a variety of preset protocols are available to a subject. In an embodiment, the TUS system includes physiological measurement capability using EEG (electroencephalogram), EOG (electrooculogram), EMG (Electromyography), or ECG (electrocardiogram) subsystems. The system includes algorithmic or machine learning functions for compensating the skull's acoustic effects and EEG biomarker detection in an embodiment. In an embodiment, the TUS system can connect to a cloud server where machine learning functions can be updated based on cloud computations.

The term "drum" refers to individual MEMS structures with vibrating suspended membranes that are actuated by piezoelectric thin films.

The term "element" refers to an autonomously acting acoustic structure composed of several "drums." All the drums in an element are wired in parallel within the MEMS die. The ASIC electronics connects to the whole element, not to individual drums.

The term "cell" refers to a group of "elements" whose electronics are repeated through an ASIC die. In one implementation, a cell controls the operation of five elements, comprising one transmitter and four receivers.

In an embodiment, the system can operate in three modes: channel, beam, and stim. Channel mode of operation can be used for skull characterization. The human skull varies in thickness, sound speed, and curvature, distorting ultrasound delivery to desired targets through attenuation, refraction, diffraction, and reflection. Channel mode is used to characterize the skull's effect on ultrasound transmission for all ultrasound transducer elements. The results from this operation are used to compensate for the effects of the skull for all ultrasound transducer elements. Beam mode operation can be used for mapping and targeting brain structures and anatomy characterization. In an embodiment, corrected element delays and amplitudes acquired in channel mode ensure the elements correctly target the desired anatomical structures. Stim (or stimulation) mode is used for treatment. Table 1 below summarizes the three modes of operation.

TABLE 1

| Mode | TX beamformer operating? | RX signal chain operating? | RX beamformer operating? | Transmit Waveform | Usage |
| --- | --- | --- | --- | --- | --- |
| Channel | No | Yes | No | Short pulse centered at the highest operating frequency | For skull characterization |
| Beam | Yes | Yes | Yes | For grayscale, a short pulse. For mapping of cranial vessels, 4-16 cycle tone-burst. | For mapping and targeting brain structures and anatomy characterization |
| Stim | Yes | No | No | Long tone-burst (300-5000 cycles). | For treatment |

There are differences between the transmit and receive beamforming operations in Beam mode. These differences mean that different parameters in the Beam List control them, as detailed below:
  In the receive beamformer, time delays are applied to the channel data continuously so that the image is in focus at every point (a dynamic receive focus). As depth increases for each channel, the schedule of delay variation is parameterized in the Beam List.
  Received data from all transducer elements are added together after appropriate delays are applied. This coherent summation may occur across tiles by "chaining" the tiles together.
  In the transmit beamformer, in the simplest mode of operation, there is a single set of delays, one for each channel, which creates a focus at a fixed depth.
  More advanced transmit beam formation for guidance can involve the transmission of plane waves at differing angles, data from which can be retrospectively combined to produce a dynamic transmit focus. In this confocal system, the transmitter and receiver are both in focus at each point in the image.

FIG. 1 shows a wearable TUS system 100 as per an embodiment. Referring to FIG. 1, subject 110 wears a TUS headband 120 (or TUS device) at a suitable location, ensuring proper contact with subject 110's scalp. Other wearable form factors such as a helmet to cover most of the scalp, half-helmet, half-headband, flexible cap, and visors are possible.

TUS system 100 includes a secure network device 130. All communication with the TUS system is through the secure network device 130. This allows for authentication and encryption of all communications, tamper detection, protection against side-channel attacks, and isolation of the subject device 140 and the internet from the operation of the TUS wearable 120.

Headband 120 communicates with the secure network device 130 using a wireless 170 network such as Wi-Fi or Bluetooth in the preferred embodiment. In an embodiment, data from the ASIC 120 is encrypted before it reaches the ASIC pins, making unauthorized access to subject measurements very difficult. FPGA 210 or microcontroller 290 may perform other encryption and decryption. A wired network (Ethernet, USB, etc.) may be used for communication in a different embodiment. To maintain high security, subject 110 cannot install any software on secure network device 130. Secure network device 130 will only allow safe commands into system 100 to ensure the safe use of wearable 120 and the safety of subject 110. Network device 130 communicates with subject device 140, such as a smartphone, tablet, laptop, smartwatch, computer, etc., using a wireless protocol such as Wi-Fi or Bluetooth. Subject 110 can control system 100's operation using an app on device 140. Messages or other communications (data) from system 100 are displayed via the app on device 140. Both network device 130 and subject device 140 are connected to a cloud server 150 via Internet 180, allowing for authentication of network device 130 and subject device 140. Cloud Server 150 enables non-real-time aspects of system 100, such as updates to the system's machine learning aspects, management of subject data, and over-the-air software updates. A clinician using portal 160 on server 150 may monitor the treatment and alter its course. In addition to ultrasound transducers, headband 120 may include an EEG sub-system. The EEG sub-system allows for monitoring the physiological efficacy of the system, such as the effect on the brain. Subject device 140 receives EEG and RX data. System 100 includes at least one physiological measurement capable system such as EOG (electrooculogram), EMG (Electromyography), or ECG (electrocardiogram) in a different implementation.

In an implementation, secure network device 130 includes a microprocessor supporting the necessary wireless protocols (Wi-Fi, Bluetooth, etc.). It translates the high-level instructions from subject device 140 or cloud server 150 into low-level commands to the TUS device or headband 120. The instruction could include commands such as "start," "stop," target locations, treatment details, stimulation parameters, etc. Other non-real-time tasks are managed by device 130. These tasks include authentication, encryption, tamper detection, protection against side-channel attacks, etc. An ASIC, off-the-shelf processor, or FPGA may be used for implementing device 130. In a different implementation, the functionality of the device 130 is merged into the wearable 120.

Figure 2:
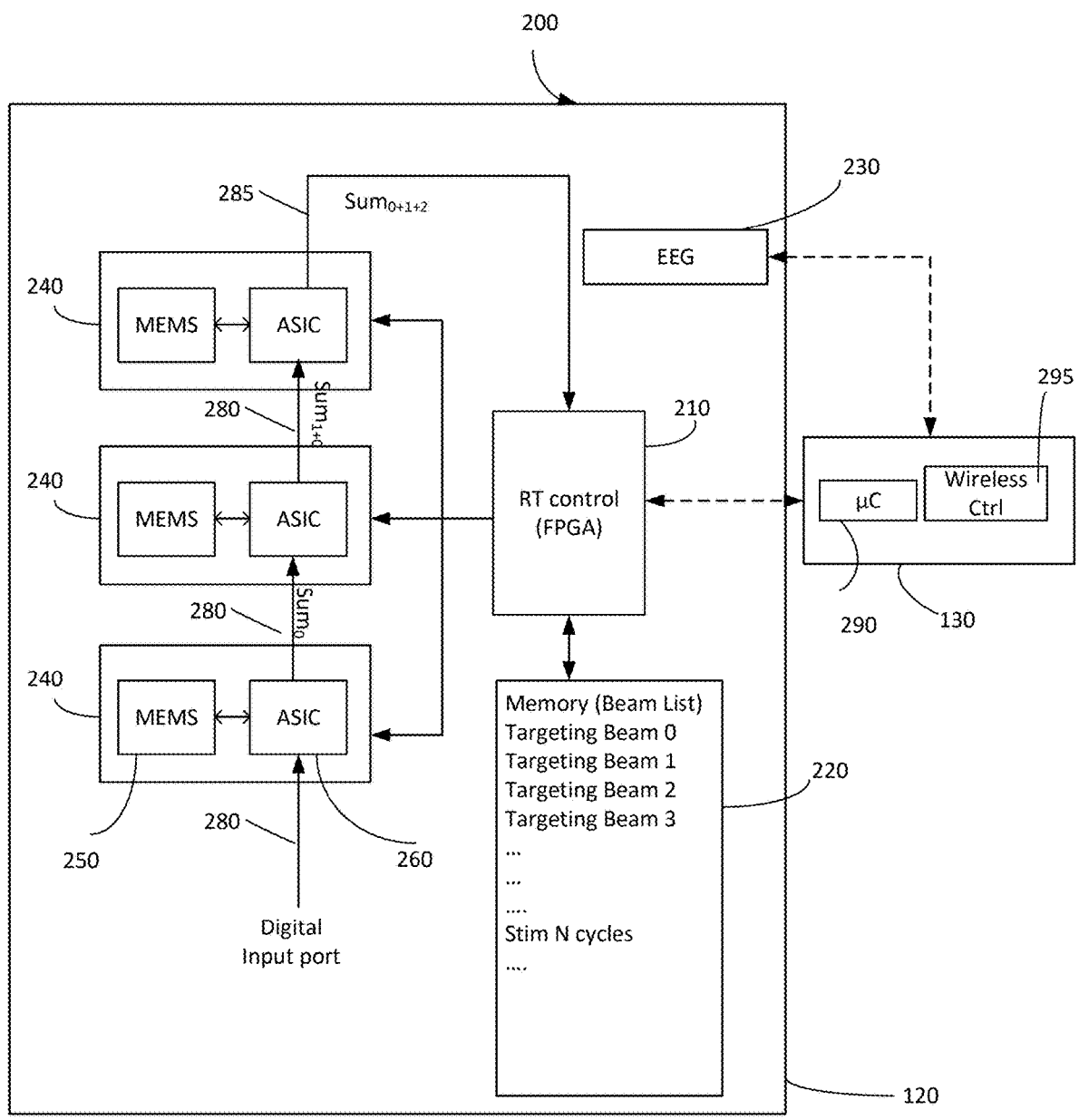
FIG. 2 is an exemplary block diagram of TUS wearable 120 used in System 100.

FIG. 2 is an exemplary block diagram 200 of TUS wearable 120 used in System 100. Referring to FIG. 2, device 120 consists of real-time (RT) control 210. In the preferred embodiment, control 210 is implemented using an FPGA. Other implementations are possible, where control 210 is implemented using ASIC, microprocessors, etc. RT control 210 communicates with secure network device 130 using a wireless protocol such as Wi-Fi or Bluetooth or a wired interface such as USB.

Attached to RT control 210 are a number of tiles 240. Each tile comprises MEMS device 250 (or MEMS die) and ASIC 260 (ASIC die or IC die). MEMS device 250 consists of a two-dimensional pMUT (Piezoelectric Micromachined Ultrasound Transducer) array transducer and is controlled by ASIC 260. Other technologies, such as cMUT (capacitive micromachined ultrasonic transducers) or bulk piezoelectric transducers, can also be used. In block diagram 200, only three tiles are shown to be connected. However, device 120 can consist of many such tiles positioned on different head parts. These tiles may be held in position by a flexible cap, with interconnection between the tiles achieved by flex circuits. The tiles, FPGA and other electronic components, and physiological sensors may be mounted on the flex, which is disposed of within the cap.

Figure 3:
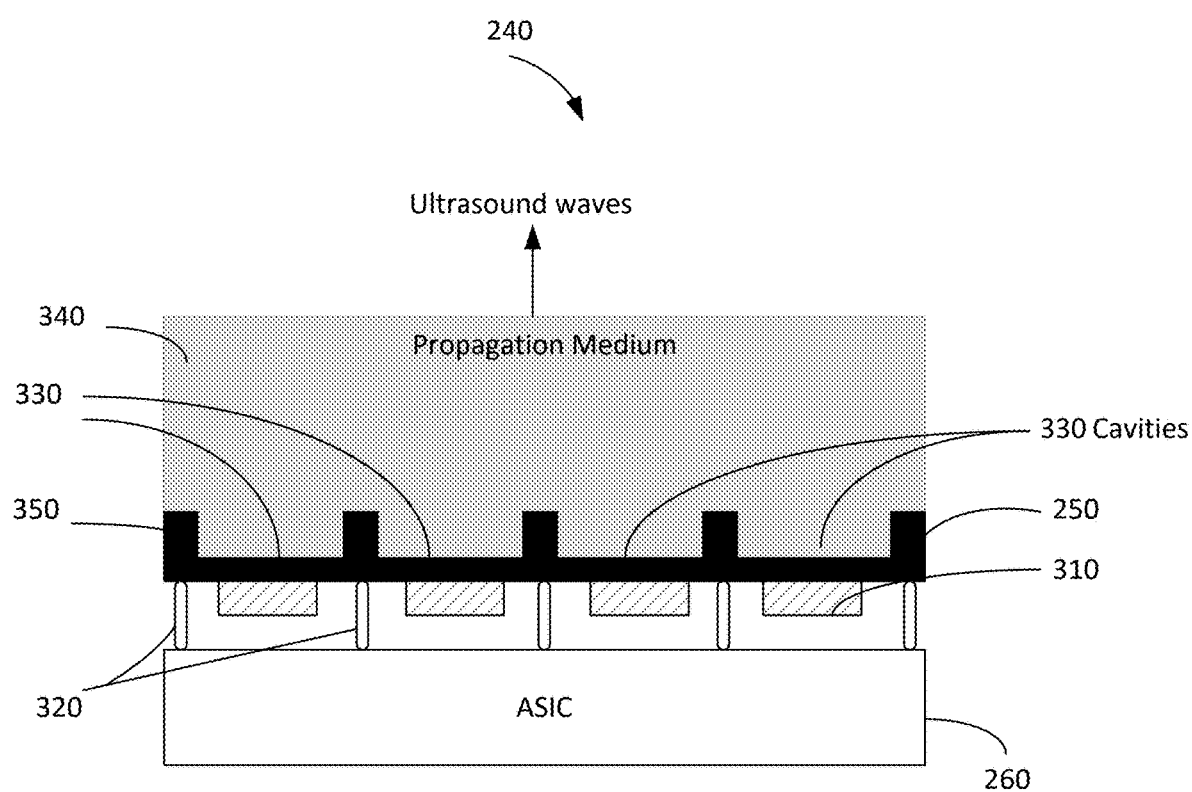
FIG. 3 shows an example of tile 240 comprising PMUT MEMS array 250 and ASIC 260.

FIG. 3 shows an example of tile 240 in cross-section comprising pMUT MEMS array 250 and ASIC 260. Referring to FIG. 3, MEMS 250 and ASIC 260 are connected using one or more vertical connections 320. FIG. 3 illustrates MEMS silicon die 250, showing back-side etching at the top side and vibrating suspended membranes (called drums in this application) above the piezoelectric layer 310. Piezoelectric layer 310 is a sandwiched layer comprising a layer of piezoelectric material such as PZT (Lead Zirconate titanate), AlN (Aluminum Nitride), or AlScN (Aluminum Scandium Nitride) with metal electrodes above and beneath it. FIG. 3 also shows the propagation or coupling medium 340 (for example, a gel) that ensures proper acoustic coupling from the MEMS drums to the subject 110's scalp. In FIG. 3, subject 100's scalp is positioned above tile 240, so the ultrasound waves labeled are directed into the head.

Referring back to FIG. 2, attached to RT control 210 is a memory 220. The memory 220 contains a list of beam parameters. In an embodiment, the beam parameters are stored in a tabular format. Memory 220 can be an external DRAM, SRAM, EEPROM, memory within the FPGA, etc. RT control 210 reads beam parameters from memory 220 and uses it to control tile 240's operation. Beam parameters may be downloaded into the memory from off-device storage during the start-up procedure.

Tiling or RX Chaining

Multiple tiles 240 can be connected. Each ASIC 260 within tile 240 can accept a digital input stream 280 from an adjacent ASIC. After appropriate delay and amplitude adjustment, the digital input stream 280 is summed with the beamformed RX data generated by the MEMS device 250 connected to the ASIC. The result of the summation is passed to the next tile's ASIC. The output 285 of the final tile 240 is sent to RT control 210.

EEG Subsystem

In an embodiment, an EEG subsystem 230 is included in System 100. EEG subsystem 230 can communicate directly to Secure Network device 130 in an embodiment. EEG subsystem 230 is used for monitoring the efficacy of treatment by monitoring the EEG signals for biomarkers. Care is taken to ensure that there is no mutual interference between the EEG subsystem 230 and the operation of ultrasound. This is practical because the EEG data is very slow compared to the ultrasound data: it has a frequency range of around 1-100 Hz, while the ultrasound data is in the low MHz range. Typically, the number of EEG channels will range from 3 to 64. EEG operation involves the passive reception of scalp electrical signals. This means it can be received directly by the microcontroller 290 (labeled μC) and does not need to connect to RT control 210. The EEG requires signal conditioning circuitry (not shown), such as analog amplification and signal filtering, which may be implemented using commercially available devices. Alternatively, and advantageously as it reduces the package count, these electronics can be implemented in mixed-signal ASIC 260.

Figure 4:
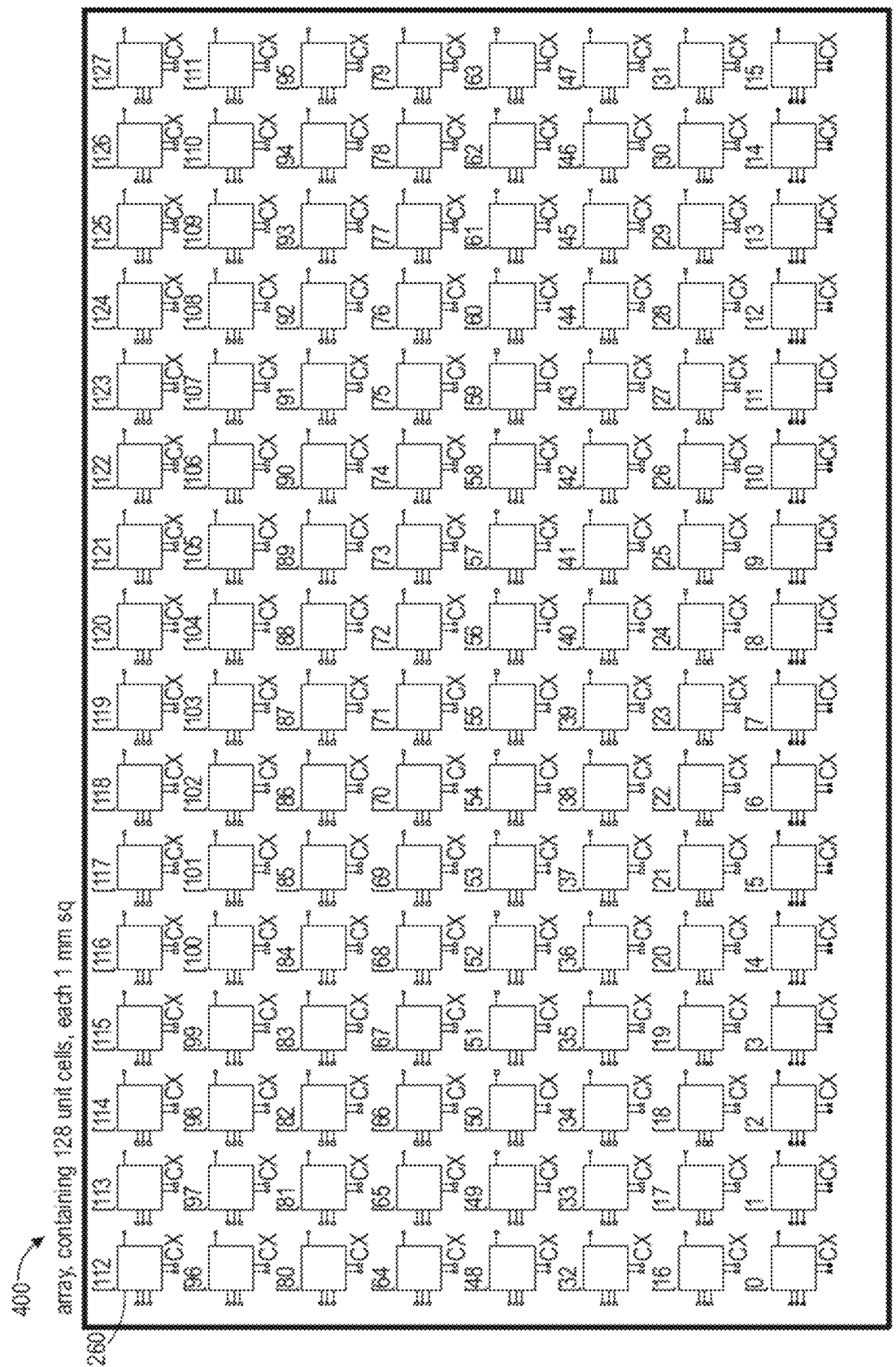
FIG. 4 shows an example ASIC 260 layout organized in a 16×8 grid.

FIG. 4 shows an example ASIC 260 layout 400 in a 16×8 grid. Referring to FIG. 4, layout 400 consists of 128 cells arranged in a 16×8 grid. In an embodiment, the cell consists of 1 transmit element and 4 receive elements. The cell's analog functions include 4 LNAs (low-noise amplifiers), eight mixers to produce in-phase and quadrature bandband outputs for each receive element, two analog summers, and 2 A/Ds (Analog-to-digital converters). A level shifter, an output stage, and digital logic are needed for the transmitter. Preferably, the functional digital pads on ASIC 260 are located on two sides only, which helps reduce the gap between transducers. This improves both transmit and receive performance.

MEMS

Figure 5:
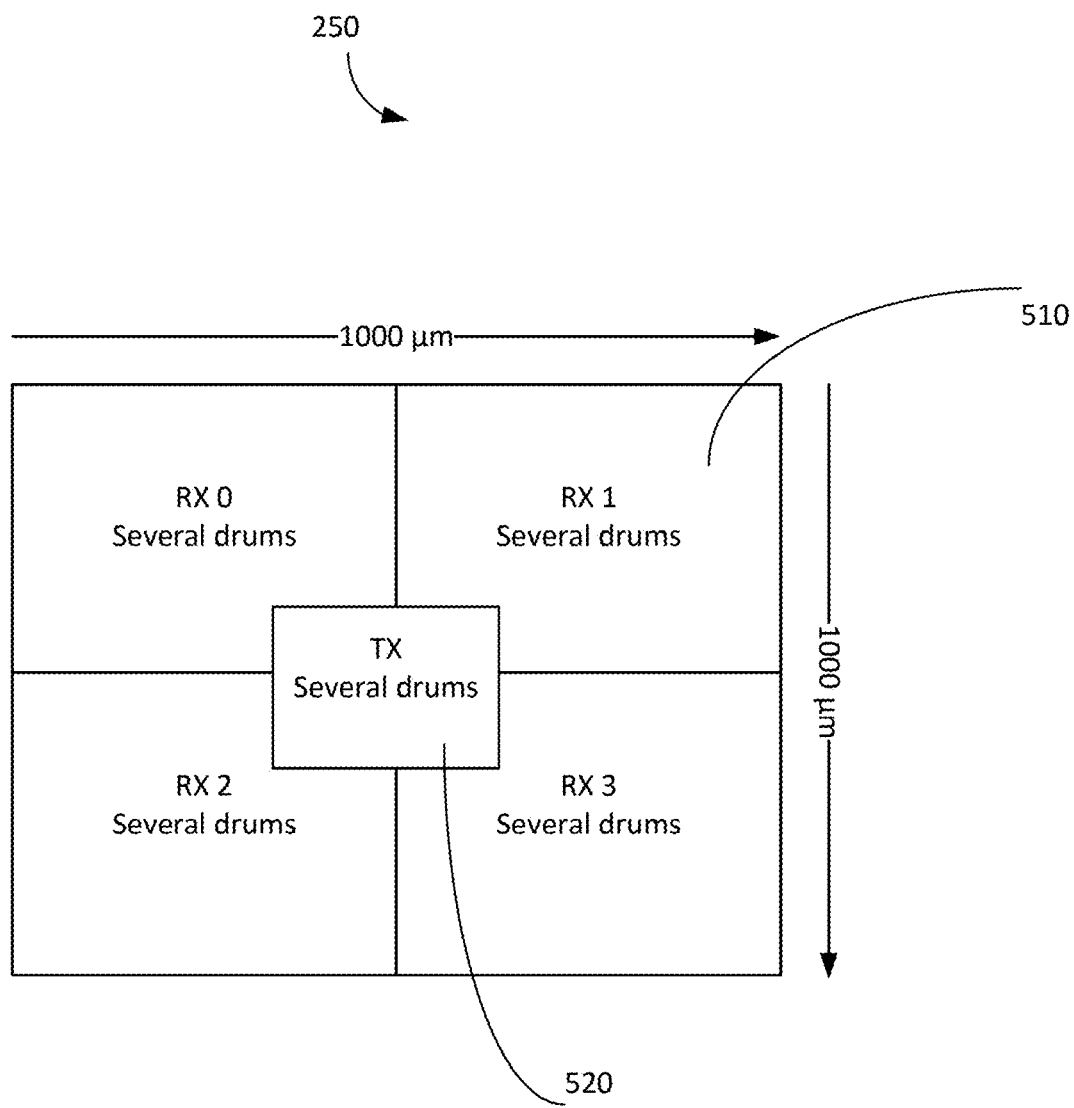
FIG. 5 shows an example layout of one cell of MEMS 250 die.

FIG. 5 shows an example layout of one cell of MEMS 250 die. Referring to FIG. 5, the MEMS 250 die consists of four receive 510 sections with a centrally placed transmit 520 section in an embodiment. Separating transmit 520 and receive regions 510, as shown, simplifies the implementation in the ASIC 260 by removing the need for any transmit/receive switching logic. Each of the five sections is connected to the ASIC 260. Each of the receive 510 regions consists of several "drums." The transmit 520 region consists of several "drums." The number of drums for each RX and TX can be fine-tuned in an implementation. Multiple drums are connected parallelly on the MEMS die to form the transmit and receive elements. In an embodiment, the receive 510 sections can operate at a different frequency from the transmit 520 sections (for example, RX frequency is twice (2×) the TX frequency). The example layout shown allows the receive elements to be packed more finely to allow the receive 510 sections to operate at a higher frequency than the transmit 520 sections. Other layouts with a different number of receive 510 sections and transmit 520 sections and in different geometrical arrangements are possible.

ASIC

Figure 6:
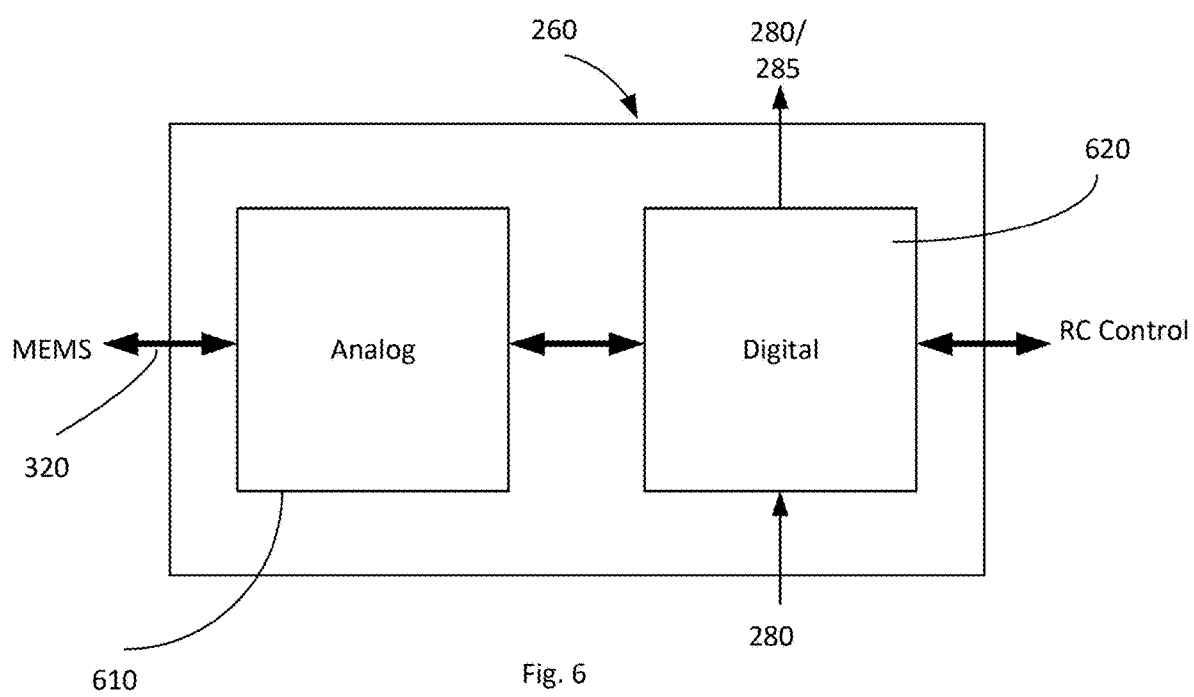
FIG. 6 shows an exemplary block diagram of ASIC 260 as per an embodiment.

FIG. 6 shows an exemplary block diagram of the ASIC 260 cell as per an embodiment. Referring to FIG. 6, the ASIC 260 cell consists of an analog block 610 and a digital block 620. The area of the ASIC cell may match that of the MEMS cell. If the ASIC cell area does not match the MEMS cell, an interposer may be placed between the two die to enable connection from elements to ASIC receive inputs and transmit outputs.

Analog Block

Analog block 610 connects to a MEMS 250 cell using interconnects 320. Analog block 610 converts the received analog signal from MEMS 250 into a digital signal and provides it to the digital block 620. The transmit section inside the Analog block 610 takes input signals from the digital block 620, which has the correct timing and pulse train for one of the three types of operation in Table 1. It converts them into an analog signal to drive MEMS 250.

Figure 7:
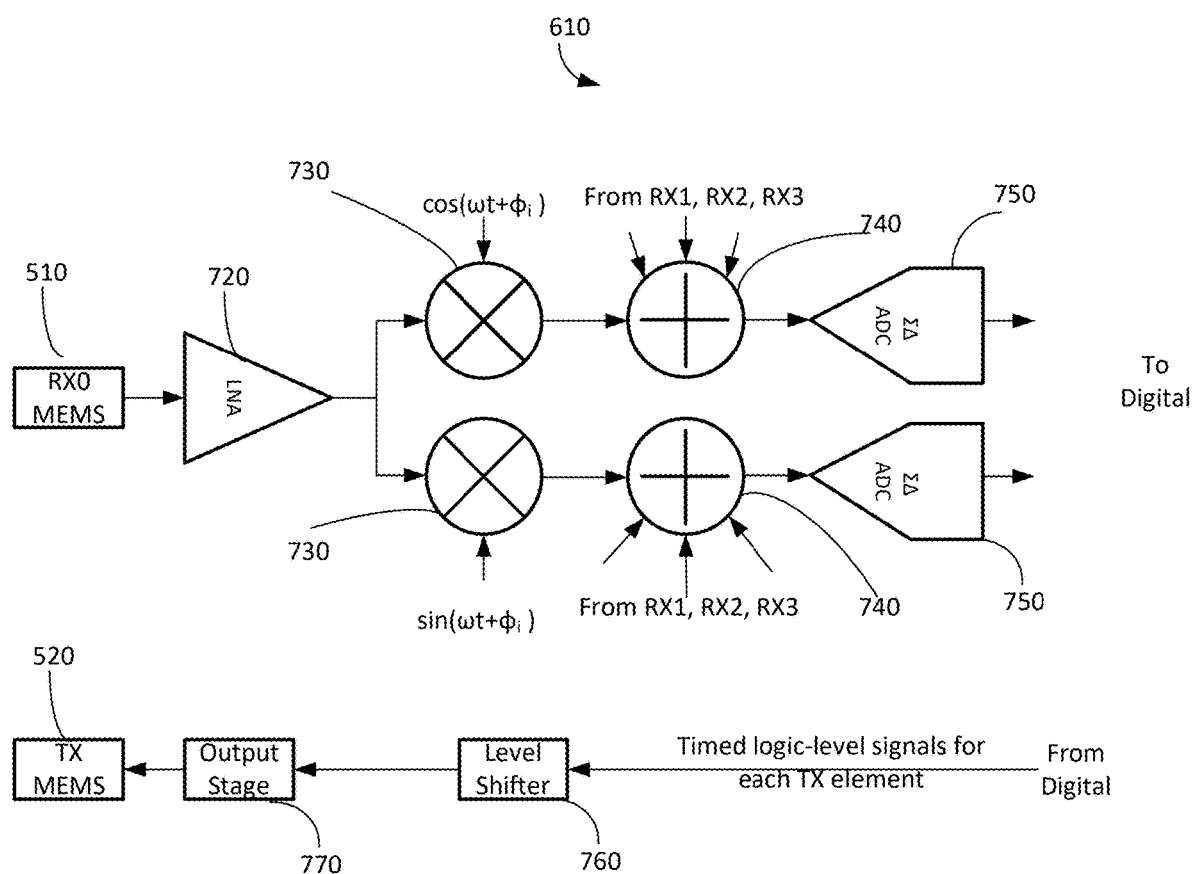
FIG. 7 shows an exemplary block diagram of Analog block 610 in ASIC 260.

FIG. 7 shows an exemplary block diagram of Analog block 610 in the ASIC 260 cell. Referring to FIG. 7, receive analog functions for RX0 MEMS 510 include LNAs 720 (low-noise amplifiers), two mixers 730, two analog summers 740, and 2 A/Ds 750 (Analog-to-digital converters, sigma-delta ADCs may advantageously be used) for the receiver. The identical LNA and mixers for the other three receive elements in the cell, labeled RX1, RX2, and RX3, are not shown. The analog receive function down-converts the received signal to baseband for the following reasons:

Four channels can be combined after very simple phase adjustments to the local oscillator, so each cell requires only two ADCs instead of four. A factor f0/Δf decreases the me and Q ADC bandwidths compared with an RF approach, where Δf is the transducer's bandwidth and f0 is its center frequency.

The digital beam formation logic needs only to service 128 data channels rather than 512.

In one implementation, the analog transmit section takes 128 input signals from the digital block with the correct timing. It consists of a level shifter 760 (for shifting output voltage to an appropriate voltage for the transmit element) and an output stage 770. In an embodiment, output stage 770 supports a three-level output of +V, +V/2, and GND to supply symmetrical waveforms around +V/2. This ensures that the transmit circuit actively returns to a resting voltage of +V/2. In an implementation, the "Ground" electrode common to all MEMS elements is held either at ground or at a bias voltage chosen to ensure that the field across the piezoelectric film never inverts and is always in the same direction as its poling. This optimizes the reliability of the film. In one implementation, operating frequencies vary between 0.5 to 3.0 MHz. Some examples of signals transmitted include:

Channel mode operation: Short, symmetrical 1-cycle or 2-cycle bursts at maximum output voltage to be used for skull characterization.

Beam mode operation:
For grayscale, short pulse centered at a lower frequency, with reception of $2^{nd}$ harmonic via, e.g., pulse inversion signaling.

For mapping of cranial vessels, 4-8 cycle tone-burst centered at mid-band frequency.

Stim Mode Operation: Long tone-burst (100-5000 cycles) centered between 0.5-2.0 MHz.

Typically, the transmit waveforms' rise and fall times are matched, and the delay quantization of transmit beamforming is around 75 ns.

Digital Block

The functions of the digital block are:

Provision of "dynamic" delays to the received signals, that is, delays that change with the depth the sound is returning from. This delay needs to account for how groups of elements have been combined in analog. Due to the need for fractional-sample delays, the delay is applied in coarse and fine stages. In one implementation, CORDIC (coordinate rotation digital computer) rotation is used for fine delays. A decimation filter is used in a different implementation, where the start and stop addresses are adjusted.

Control of each channel's signal amplitude as a function of depth.

Summation of channel data after the above delay and amplitude processing.

Provision for adjustment of delay and amplitude to compensate for the aberrating effects of the skull.

Ability to accept digital data from another ASIC, delay it, and sum with the beamformed data produced from the received elements. This allows tiles to be "chained."

Creation of digital signals with the correct timing for each analog transmit section. These are delayed from the start signal by an amount with a geometrical component and a correction component based on skull measurements.

Ability to operate in (1) normal beamforming mode, where channels are combined after delay and amplitude adjustment, (2) a channel mode, where data is not beamformed. This "channel" mode helps characterize the skull, and (3) in the stim mode.

Figure 8:
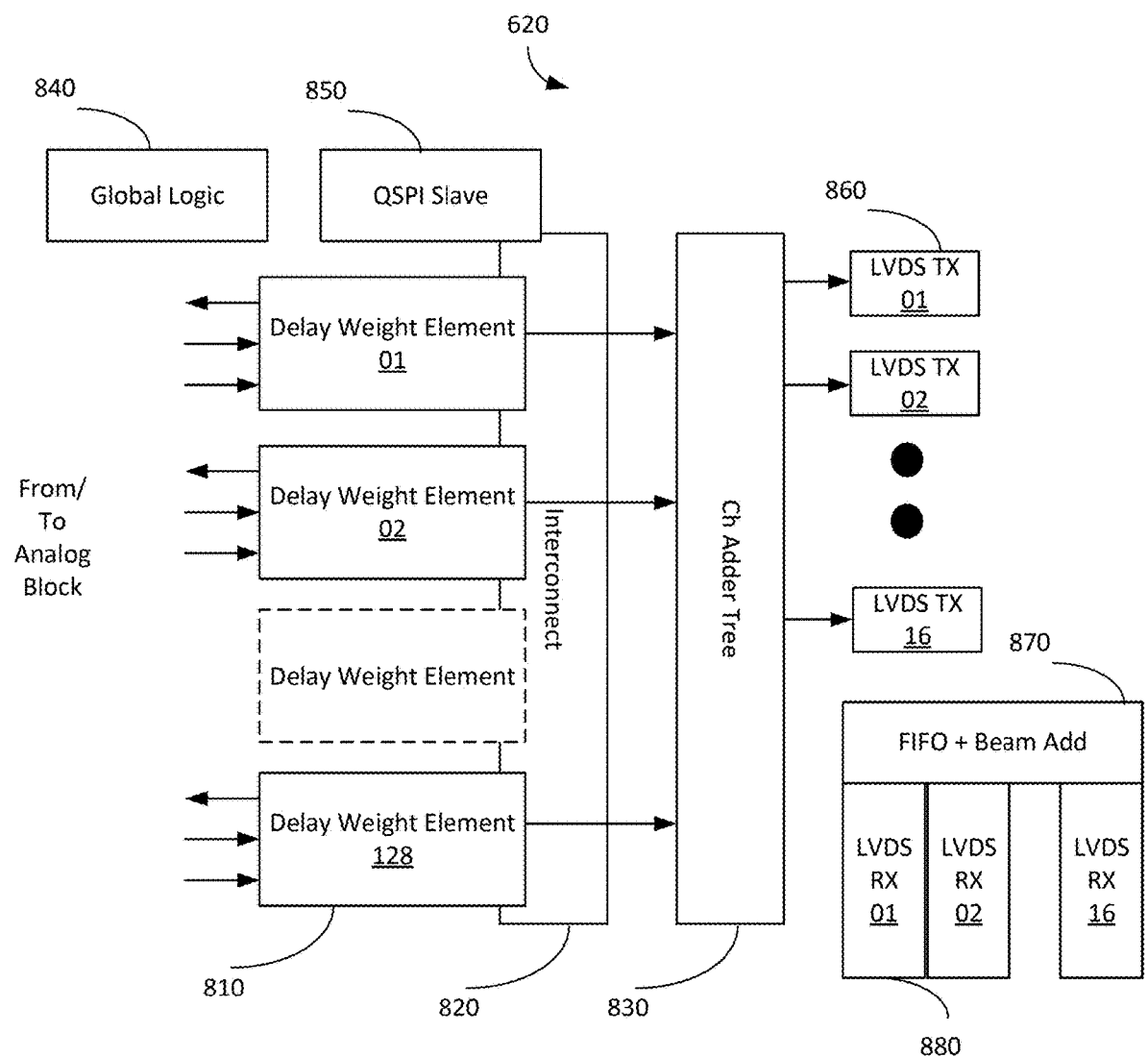
FIG. 8 shows an exemplary functional block diagram of the digital block 620.

FIG. 8 shows an exemplary functional block diagram of the digital block 620. The core of the digital block 620 is the Delay Weight Element (DWE) 810 subsystem. This subsystem, detailed further in FIG. 9, creates correctly timed signals to be fed into the transmitter analog function. The receiver section receives data supplied to it from the baseband ADC outputs and carries out digital operations, resulting in the data's beam formation. Referring to FIG. 8, in an embodiment, digital block 620 comprises 128 Delay Weight Elements 810, Interconnect 820, Channel Adder tree 830, FIFO and Beam Adder 870, 16 LVDS transmit 860 & 16 LVDS receive 880 pairs, a QSPI slave interface 850, and global logic block 840. The global logic block (among other functions) is responsible for taking the representations of beam direction and focal parameters supplied to it from the Beam List and computing the low-level parameters stored in memories 960 and 940.

LVDS transmit 860 and LVDS receive 880 are used for tile chaining. The received LVDS data is delayed in the FIFO 870 before being added to the tile's data in Beam Add section 870 and sent to the next tile in the chain via LVDS TX 860.

Analog data is received from analog block 610, and a dynamic delay as a function of depth is applied by the delay weight element 810. The delay weight element also adjusts, again as a function of depth, the amplitude of the channel data. After appropriately adjusting the amplitude and delay of the channel data, it is fed to the channel adder tree 830 for summation. QSPI slave 850 provides an interface to the RT control 210. RT control 210 uses this interface to provide a beam list and other control information. Global logic provides overall control to the digital block 840 and interconnect 820 provides on-chip interconnect between the various functional blocks.

Delay Weight Element (DWE)

Figure 9:
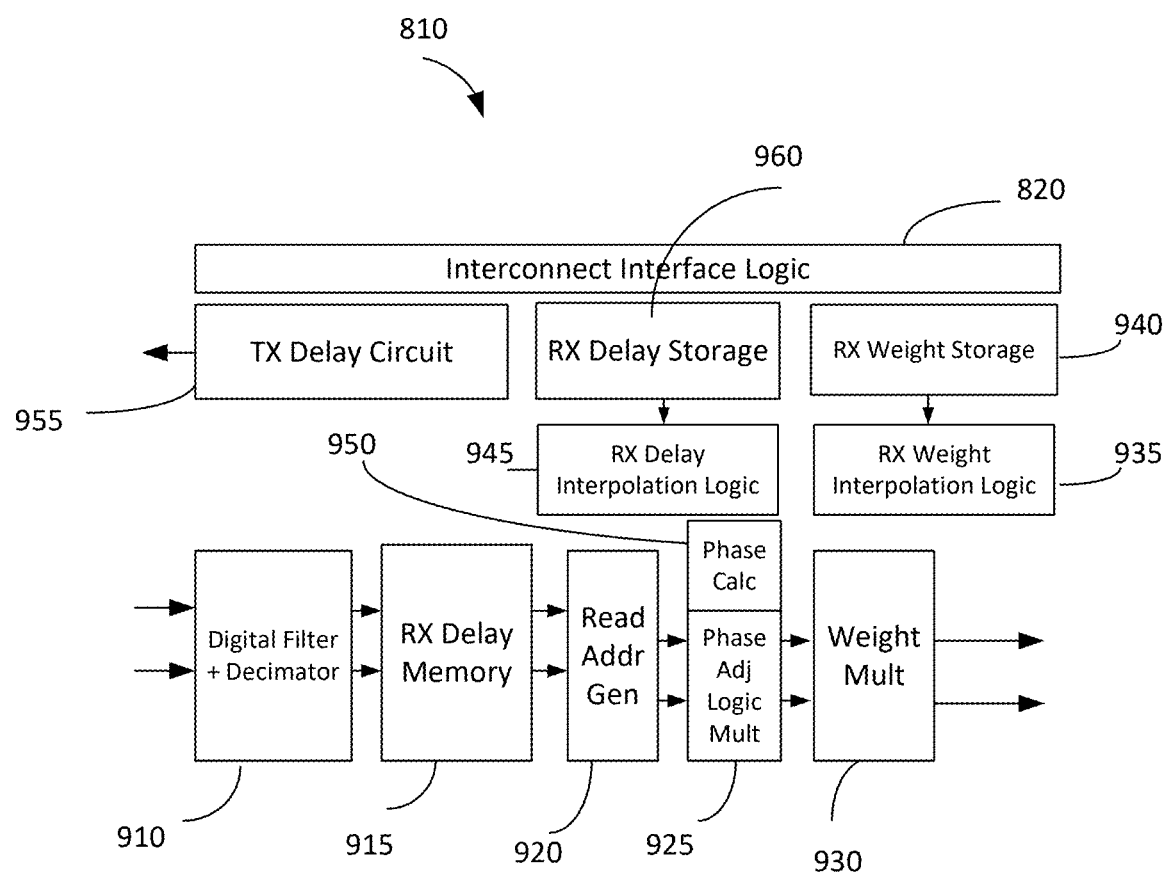
FIG. 9 shows an exemplary block diagram of DWE 810.

FIG. 9 shows an exemplary block diagram of DWE 810. The transmit delays specified in the beam list are implemented in the TX Delay Circuit block 955. These delays can be implemented using a memory or by other techniques.

The dynamic receive processing is more complex since the delays and weights must change with depth. Values of delay and amplitude to be applied to the data at certain depths are stored in memories 960 and 940. Logic in blocks 945 and 935 allows interpolated delays and weights to be applied at depths between those specified in memories 960 and 940.

The signal path for the delay weight element begins with the digital filter and decimator 910. Here, the ADC output is filtered to remove out-of-band noise, and the sampling rate is reduced to the lowest value consistent with adequate sampling of the baseband data. After this, a coarse delay is implemented through the write and read addresses of the delay memory 915. Generation of the read address, which varies with depth, is accomplished by block 920. Fractional delays may be implemented using an interpolator and logic 945. Further fine control of the signal phase may be implemented using the phase adjustment logic 925. After this processing, the received signals from a point target will be time-aligned across all channels and ready for summation. Before the summation, a multiplier 930 implements the apodize or weighting operation. This is driven by the weight interpolation logic 935 from data in memory 940.

Closed Loop TUS Method

Figure 10:
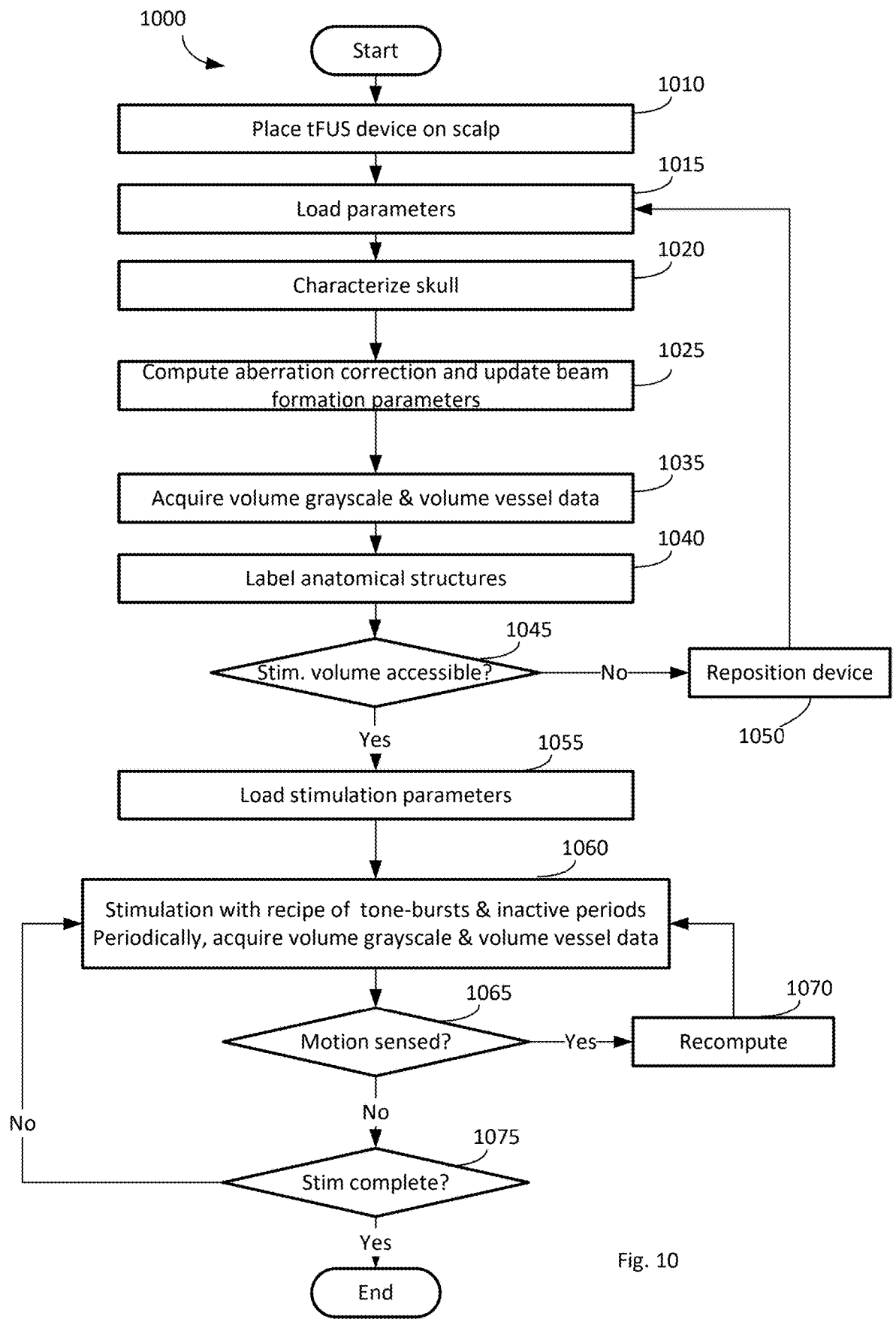
FIG. 10 is an exemplary method 1000 for closed loop operation of TUS wearable 120.

FIG. 10 is an exemplary method 1000 for closed loop operation of TUS wearable 120. Method 1000 can be performed using System 100. Method 1000 can correct skull aberrations, determine if device 120 is placed at the correct location, and if the device has shifted or moved while in use. Referring to FIG. 10, in operation 1010, wearable device 120 is placed on the scalp of subject 110.

In operation 1015, various operational parameters, such as the beam list, are loaded into the wearable. For example, RT control 210 loads the beam list from Memory 220 and provides it to ASICs 260 along with control information.

In operation 1020, device 120 is operated in "channel" mode for skull characterization. As described earlier, various characteristics of the human skull complicate ultrasound delivery to desired targets. In this operation, the method characterizes the skull's effects on ultrasound for each transducer element. In this operation, the TUS device's transducer elements transmit a short pulse at a suitable center frequency. Received data are captured with RX beamforming turned off, and the data are used to characterize the subject's skull.

In operation 1025, the received and transmitted data from operation 1020 are analyzed to determine the skull's effects, and appropriate correction parameters are computed for each transducer element. Beam formation parameters for all transducer elements are updated.

In operation 1035, the method maps and targets brain structures (or anatomy characterization) with the device operating in "Beam" mode. First, a volume grayscale image (2-D image) of the brain structures is acquired, followed by acquiring volume vessel data (blood flow) using Doppler processing.

In operation 1040, the method using pattern recognition, machine learning, or any suitable algorithms determines or labels the information acquired in Operation 1035 (brain structures and volume vessel data). This helps to determine if the device is placed correctly on the subject's scalp and, assuming adequate positioning, allows the stimulation to be targeted.

In operation 1045, the method determines if the stimulation target is accessible based on device 120's location on subject 110's scalp. If the target(s) are inaccessible, the following operation in the method is Operation 1050. If the target(s) are accessible, the following operation is Operation 1055.

In operation 1050, a message is sent to subject 110 from device 120 to reposition the device. For example, the message via secure network device 130 may be displayed on the app on subject device 140. The method proceeds to Operation 1015.

In operation 1055, stimulation parameters are loaded. In wellness mode, a variety of preset stimulation waveforms are available to a subject. In medical treatment mode, a clinician will specify the stimulation waveform and other parameters such as treatment length, burst length, time between bursts, etc. For example, the real-time control loads the beam list from Memory 220 and provides it to ASICs 260 along with control information. Steering and focusing information for all TX transducer elements is calculated. This includes a set of delays for each transducer element and, potentially, parameters enabling advanced beam formation involving plane wave transmission at differing angles.

In operation 1060, stimulation is started. Stimulation waveforms are long tone bursts (300 to 5000 cycles) centered at a suitable stimulation frequency, interspersed with inactive periods. Stimulation waveform parameters such as tone burst duration, pulse repetition frequency, acoustic frequency, amplitude intensity, etc., are determined by a clinician's treatment plan (or recipe). Device 120 ensures that no stimulation waveform parameters are beyond a safe range and that subject 110 cannot change stimulation waveform parameters to unsafe levels. Periodically, device 120 acquires grayscale and vessel data. For example, the device may acquire grayscale and vessel data after every 1/(pulse repetition frequency) or a multiple of 1/(pulse repetition frequency). Periodically acquiring grayscale and vessel data helps determine if headband 120 shifted while in use.

In operation 1065, using cross-correlation or other algorithms on sequentially acquired grayscale and vessel data, it is determined whether significant relative motion between the device or headband 120 and subject 110's scalp occurred. Significant relative motion between the device and the subject's scalp could cause ineffective stimulation since the stimulation beam may no longer be directed to the target tissue. If motion is sensed, the following operation is Operation 1070. If there was no significant movement, the following operation is Operation 1075.

In operation 1070, steering and focusing information for all TX transducer elements is recalculated. Method 1000 proceeds to operation 1060.

In operation 1075, Method 1000 checks if stimulation is complete. Stimulation could end due to an explicit command (from the subject) or because the prescribed NTB (number of tone bursts) is over. If the stimulation is incomplete, the method proceeds to operation 1060; otherwise, the method ends.

What is claimed is:

1. A system comprising:
   a headband device comprising one or more transcranial ultrasound (TUS) tiles, wherein each of the TUS tiles further comprises a plurality of transducer elements connected to an integrated circuit, and wherein the TUS tiles are arranged in an array that are electrically coupled with adjacent tiles in the array; and
   a computing device in wireless communication with the headband device, the computing device generating a stimulation signal specification and transmitting the stimulation signal specification to the headband device, wherein the TUS tiles output the stimulation signal via the headband device.

2. The system of claim 1, wherein the headband device further comprises at least one physiological measurement subsystem.

3. The system of claim 1, wherein the computing device performs authentication, encryption, tamper detection, and side-channel attack protection on behalf of the headband device.

4. The system of claim 1, further comprising a real-time control circuit coupled to the headband device, wherein the real-time control circuit reads beam parameters from a memory causing the TUS tiles to output a beam according to the beam parameters.

5. The system of claim 4, wherein the real-time control circuit causes the headband device to operate in a channel mode, a beam mode, or a stimulation mode.

6. The system of claim 5, wherein in the channel mode the real-time control circuit causes the headband device to obtain skull characterization data using the TUS tiles, wherein the computing device generates skull compensation parameters based on the skull characterization data.

7. The system of claim 6, wherein in the beam mode, the real-time control circuit determines whether the headband device is targeted at a desired anatomical structure based on the skull characterization and anatomy characterization data.

8. The system of claim 6, wherein in the beam mode, the computing device detects blood flow or a blood vessel location based upon the skull characterization data.

9. The system of claim 6, wherein the real-time control circuit, in the channel mode, causes the TUS tiles to communicate with an adjacent tile in an array of tiles and wherein the real-time control circuit disables transmit or receive beamforming.

10. The system of claim 5, wherein the real-time control circuit causes the headband device to output a stimulation beam.

11. The system of claim 1, further comprising a memory storing control parameters for the headband device, wherein the control parameters define beam parameters for a plurality of operational modes.

12. The system of claim 1, wherein the TUS tile comprises a micro- electromechanical system (MEMS) device, the MEMS device comprising at least one of a Piezoelectric Micromachined Ultrasound Transducer (pMUT) or a capacitive micromachined ultrasonic transducers (cMUT).

13. The system of claim 12, wherein the MEMS device further comprises at least one receive portion and a transmit portion, wherein the transmit portion is electrically separated from the at least one receive portion.

14. The system of claim 12, wherein the MEMS device is electrically coupled to an integrated circuit.

15. The system of claim 14, wherein the integrated circuit comprises an analog block and a digital block.

16. The system of claim 15, wherein the analog block receives data from at least one receive portion of the MEMS device and transmits data to the transmit portion of the MEMS device.

17. The system of claim 16, wherein the integrated circuit comprises at least one of a LNA, summers, sigma-delta ADC, level shifter, or output stage.

18. A method comprising:
    placing a headband device comprising a plurality of transcranial ultrasound (TUS) tiles on a subject scalp;
    obtaining TUS parameters from a memory, the TUS parameters specifying an operational mode of the TUS tiles;
    obtaining skull characterization parameters from the TUS tiles by operating the TUS tiles in a channel mode;
    calculating skull aberration correction parameters based on the skull characterization parameters;
    adjusting the TUS parameters based on the skull aberration correction parameters; and
    generating a stimulation signal based on the adjusted TUS parameters, wherein the TUS files emit the stimulation signal via the headband device.

19. The method of claim 18, further comprising generating volume grayscale data or vessel data to visualize a skull or blood vessel by operating the TUS tiles in a beam mode.

20. The method of claim 19, further comprising verifying positioning of the headband device based on the volume grayscale data or vessel data.

21. The method of claim 20, further comprising emitting the stimulation signal in response to verifying positioning of the headband device.

22. The method of claim 19, further comprising:
    determining, based on the volume grayscale data or vessel data, whether relative motion exceeding a threshold between the headband device and the subject scalp occurred; and
    generating a message to reposition the headband device in response to the determination.

* * * * *